(12) United States Patent
Bächle

(10) Patent No.: US 6,213,885 B1
(45) Date of Patent: *Apr. 10, 2001

(54) CASTELLATED FLANGE NUT

(75) Inventor: Ewald Bächle, Hausach (DE)

(73) Assignee: Erich Neumayer GmbH & Co. KG, Hausach (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,056

(22) Filed: Sep. 12, 1997

Related U.S. Application Data

(63) Continuation of application No. 08/047,091, filed on Apr. 14, 1993, now abandoned.

(30) Foreign Application Priority Data

| Apr. 18, 1992 | (DE) | 42 12 961 |
| Apr. 18, 1992 | (DE) | 42 12 962 |
| Apr. 18, 1992 | (DE) | 42 12 964 |

(51) Int. Cl.⁷ .............................. B21D 53/24; F16B 29/22
(52) U.S. Cl. ............................................ 470/19; 411/250
(58) Field of Search .................................. 411/185, 186, 411/189, 286, 432, 544, 431, 533, 154, 155, 937.1; 470/19, 25, 26

(56) References Cited

U.S. PATENT DOCUMENTS

| 1,314,668 | * | 9/1919 | Jacques | 470/25 |
| 1,320,259 | * | 10/1919 | Martens | 411/155 |
| 1,449,243 | * | 3/1923 | Peckham . | |
| 1,734,445 | * | 11/1929 | Place | 411/280 |
| 2,013,460 | * | 9/1935 | Erdman . | |
| 2,015,596 | * | 9/1935 | Harvey . | |
| 2,016,296 | * | 10/1935 | Rosborough . | |
| 2,349,513 | * | 5/1944 | Mortus . | |
| 2,588,372 | * | 3/1952 | Erb | 411/432 |
| 3,016,941 | * | 1/1962 | Coldren | 411/155 |
| 3,056,443 | * | 10/1962 | Knocke | 411/186 |
| 3,194,292 | * | 7/1965 | Borowsky | 411/155 |
| 3,702,628 | * | 11/1972 | Cosenza | 411/480 |
| 4,338,054 | * | 7/1982 | Dahl . | |
| 4,422,236 | * | 12/1983 | Ware . | |
| 5,056,975 | * | 10/1991 | Ando | 411/155 |
| 5,088,868 | * | 2/1992 | Cosenza | 411/280 |

FOREIGN PATENT DOCUMENTS

| 1011729 | * | 6/1952 | (FR) | 411/432 |
| 1549508 | * | 12/1968 | (FR) | 411/280 |
| 79131 | * | 12/1933 | (SE) | 411/155 |

* cited by examiner

Primary Examiner—Flemming Saether
(74) Attorney, Agent, or Firm—Darby & Darby

(57) ABSTRACT

A combined castellated and flange nut has a flange with a flat or conical underside, a clamping section with a conical internal thread and several axially parallel recesses, and a torque receiving second section between the clamping section and the flange. The second section has a cylindrical internal thread. At least the conical thread and the recesses of the clamping section are obtained by solid reshaping.

1 Claim, 3 Drawing Sheets

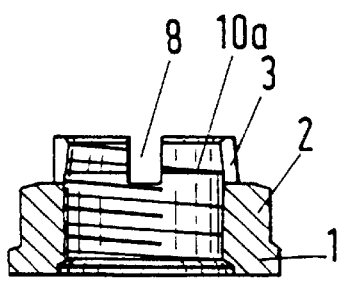
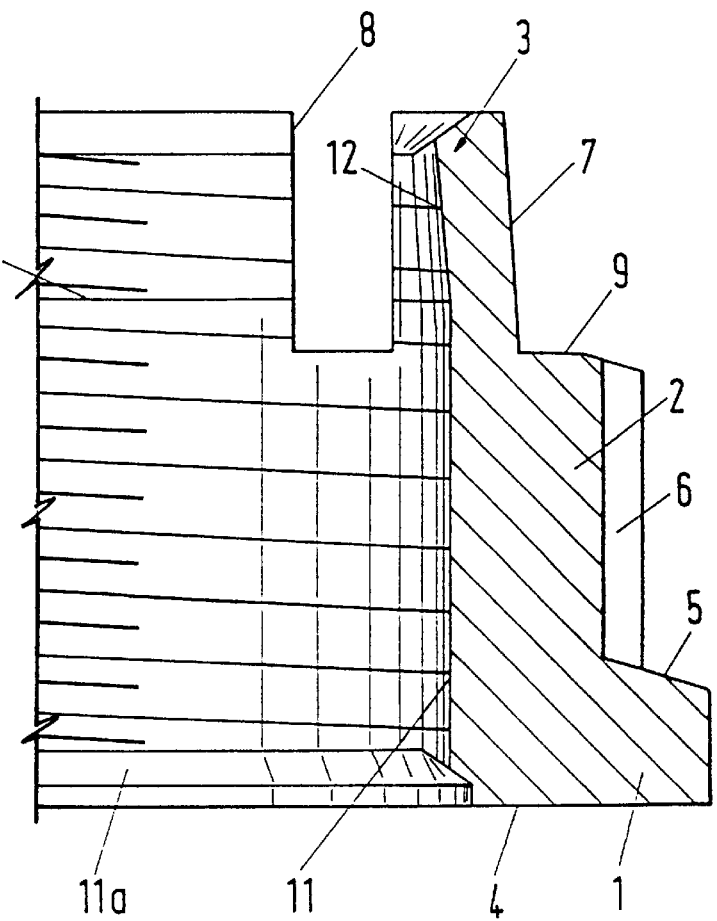
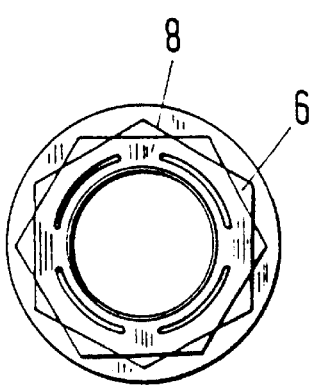

CASTELLATED FLANGE NUT

This application is a streamlined continuation of application Ser. No. 08/047,091, filed Apr. 14, 1993, now abandoned. The flange nut which is described and shown in the present application is similar to flange nuts described and shown in commonly owned co-pending patent applications having application Ser. No. 08/047,572, filed Apr. 14, 1993; and application Ser. No. 08/927,643, filed Sep. 11, 1997, which is a streamlined continuation of application Ser. No. 08/047,574, filed Apr. 14, 1993, now abandoned.

BACKGROUND OF THE INVENTION

The invention relates to threaded fasteners in general, and more particularly to improvements in female (internally threaded) fasteners commonly known as nuts. Still more particularly, the invention relates to improvements in nuts with enlarged bases which obviate the need for washers; such nuts are known as flange nuts. Still more particularly, the invention relates to improvements in so-called castellated or castle nuts wherein a torque receiving intermediate section is disposed between a so-called clamping section or castle and a flange or base.

It is already known to solidly reshaping or massively form simple nuts by resorting to cold- and/or hot-extrusion; for example, such nuts can be used to separably secure wheel hubs to the axles of motor vehicles. It is also known to massively form castellated nuts and to provide such nuts with bases or flanges which are caused to bear against selected objects, e.g., wheels, in response to rotation of their torque receiving sections by the working end of a wrench or another suitable torque applying tool while the nut mates with an externally threaded fastener which is affixed to an axle and extends through a hole of a wheel hub for use in an automobile or another vehicle. The torque receiving section can be of one piece with or it can be separately produced and thereafter affixed to a flange. As a rule, the castellated clamping section is provided with a conical internal thread which tapers in a direction toward the axis of the nut and away from the flange. On the other hand, the torque receiving section is provided with a cylindrical internal thread which is complementary to the external thread of a screw, bolt or another male threaded fastener. Still further, it was already proposed to provide the castellated clamping section with a set of axially parallel recesses.

The conventional mode of making a combined castellated flange nut involves the making of a cylindrical internal thread in the clamping section, the making of a cylindrical internal thread in the torque receiving section, a material removing step which involves the formation of axially parallel slots in the clamping section, and a following step of bending the zones of the clamping section between neighboring slots radially inwardly at the junctions with the torque receiving section. This last mentioned step results in conversion of the originally cylindrical internal thread of the clamping section into a substantially frustoconical thread whose conicity is not very pronounced. The material removing operation which is being resorted to for the making of axially parallel slots in the partially finished clamping section results in the development of burrs or fins which extend radially inwardly into the central passage of the clamping section. Such burrs or fins must be removed in a separate step which contributes to the cost and to the length of the interval elapsing for the making of a nut. If the burrs or fins are not removed (or are not completely removed) from the interior of a clamping portion, they cause the development of pronounced localized friction which, in turn, causes extensive wear upon the external thread of a male fastener and/or the internal thread of the nut.

OBJECTS OF THE INVENTION

An object of the invention is to provide a nut which does not exhibit the drawbacks of the aforedescribed conventional nuts.

Another object of the invention is to provide a novel and improved flange nut.

A further object of the invention is to provide a novel and improved castle nut.

An additional object of the invention is to provide a novel and improved combined castellated and flange nut.

Still another object of the invention is to provide a novel and improved flange or base for use in a nut of the above outlined character.

A further object of the invention is to provide a novel and improved method of making a composite castellated and flange nut.

Another object of the invention is to provide a novel and improved method of making the castle or clamping section and the torque receiving section of a castellated nut.

An additional object of the invention is to provide a nut which can be utilized with advantage as a component part of threaded fastener means for removably securing wheel hubs in vehicles.

Still another object of the invention is to provide a nut which is less likely to become loose in actual use than conventional flanged and/or castellated nuts.

A further object of the invention is to provide a nut which is highly unlikely to become loose after numerous repeated separations from and reengagements with an object (such as a wheel hub) which is to be secured in a selected position by the improved nut in conjunction with a male (externally threaded) fastener.

Another object of the invention is to provide a simple, compact and inexpensive nut which can be mass produced in available machines.

An additional object of the invention is to provide a castellated nut whose castle or clamping section can generate and maintain a substantially uniform clamping torque with a minimum of straying from an optimal value.

Still another object of the invention is to provide a combined castellated and flange nut which can but need not be made of a single type of material.

A further object of the invention is to eliminate various adverse influences which could affect the uniformity and/or other desirable characteristics of clamping torque exerted by the castle of a castellated nut.

Another object of the invention is to provide a nut which is constructed and configurated in such a way that eventual departures from optimum axial length, optimum diameter and/or optimum angle or angles do not appreciably affect or do not affect at all the desirable characteristics of the flange and/or torque receiving section and/or clamping section.

SUMMARY OF THE INVENTION

The invention is embodied in a rotary nut which can be utilized with particular advantage to fasten a wheel in a vehicle. The improved nut comprises a flange, a substantially sleeve-like clamping section which is spaced apart from the flange, and a torque receiving section coaxial with and disposed between the flange and the clamping section.

The flange has a side (hereinafter called underside) facing away from the two sections and being engageable with an object (such as a hub) in response to rotation of the nut around an externally threaded bolt, screw or other suitable fastener. The clamping section has an internal surface and an external surface, and at least one of these surfaces is a conical frustum and tapers toward the common longitudinal axis of the two sections in a direction away from the underside of the flange. The clamping section further comprises a plurality of recesses which extend in substantial parallelism with the common longitudinal axis of the two sections, and the torque receiving section has a substantially cylindrical internal thread in contrast to the internal surface of the clamping section which is provided with a conical thread. The conical thread and the recesses are obtained as a result of a material removal operation.

The torque receiving section is preferably provided with a polygonal external face which is engageable by the working end of a wrench or another suitable torque transmitting tool. The clamping section is or can be of one piece with the torque receiving section.

The flange can be of one piece with the torque receiving section or it can constitute a separately produced part which is affixed to the torque receiving section either in such a way that the flange and the second section are non-rotatably secured to one another (e.g., by welding) or in such a way that the torque receiving section and the flange can turn relative to each other about the common longitudinal axis of the two sections.

The cylindrical internal thread of the torque receiving section can be obtained as a result of material removal reshaping. For example, the cylindrical and the conical threads can constitute rolled, cut, chased or otherwise formed threads. At least one of the two threads can be formed in a numerically controlled thread cutting machine chasing or other suitable machine.

The nut can be provided with a substantially circumferentially extending internal groove between the cylindrical and conical threads.

The flange can be obtained as a result of massive forming regardless of whether the flange is of one piece with, rigidly affixed to or rotatably connected with the torque receiving section.

The underside of the flange can be at least partially concave, and such flange can be made of a resilient material. At least one of the diameter, thickness, the material of the flange and the concavity of the underside of the flange can be selected in such a way that the flange undergoes only elastic deformation (rather than plastic deformation or exclusively plastic deformation) in response to the application of a force which is required to reduce the concavity of the underside of the flange at least close to zero.

The nut can be constructed and configured in such a way that the flange is provided with a second side adjacent the torque receiving section and such torque receiving section has a further face adjacent and making an acute angle with the second side. The acute angle diverges radially outwardly from the common longitudinal axis of the two sections. This acute angle is or can be larger than an angle between the concave underside of the flange and a plane which is normal to the common longitudinal axis of the two sections (as measured prior to deformation of the flange).

The novel features which are considered as characteristic of the invention are set forth in particular in the appended claims. The improved castellated flange nut itself, however, both as to its construction and the mode of making the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1a is a sectional view of a castellated flange nut along the common longitudinal axis which embodies one form of the present invention;

FIG. 1b is a plan view of the nut which is shown in FIG. 1a;

FIG. 1c is an enlarged view of the right-hand half of the structure which is shown in FIG. 1a;

FIG. 2b is a plan view of the nut which is shown in FIG. 2a;

FIG. 3b is a plan view of the nut which is shown in FIG. 3a.

DESCRIPTION OF PREFERRED EMBODIMENTS

Figure 2A:
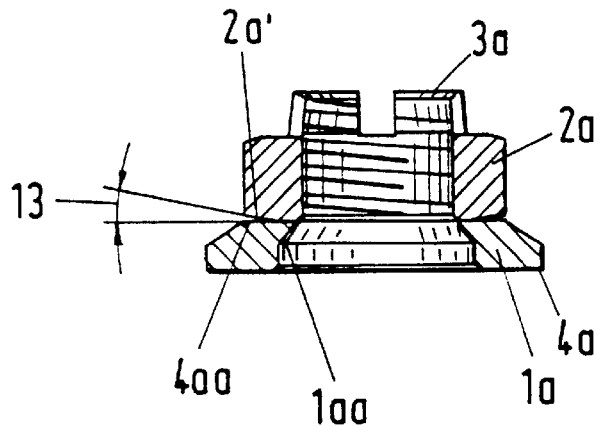
FIG. 2a is a sectional view of a modified castellated flange nut along the common longitudinal axis.

FIGS. 1a, 1b and 1c illustrate the details of a one-piece castellated flange nut which embodies one form of the invention. This nut comprises three sections, namely a base or flange 1, a torque receiving median section 2 and a sleeve-like clamping section or castle 3. The flange 1 has a flat or plane side or end face 4 (hereinafter called underside) which is caused to lie flat against an object when the nut is applied while being in mesh with a bolt or screw, not shown. The opposite side (i.e., the upper side or upper end face) 5 of the flange 1 is frustoconical and tapers in a direction toward the longitudinal axis of the nut and away from the underside 4.

The torque receiving section 2 is provided with uniformly distributed external projections 6 which impart to its external surface a polygonal outline best suited for reliable engagement by the working end of a wrench or any other suitable torque applying tool. The maximum transverse dimension of the torque receiving section 2 is less than the maximum diameter of the flange 1.

The maximum transverse dimension of the sleeve-like clamping section or castle 3 is less than the maximum transverse dimension of the torque receiving section 2, and this clamping section has a frustoconical external surface 7 which tapers in the same direction as the upper side 5, namely toward the longitudinal axis of the nut and away from the underside 4 of the flange 1. The clamping section 3 is further provided with several at least substantially radially extending at least substantially parallel recesses 8 along the longitudinal axis (FIG. 1b shows four equidistant recesses 8) in the form of slots which serve for reception of the working end of a screw driver or another torque transmitting tool. The recesses 8 extend along the longitudinal axis of the nut to the level of the radially extending top surface of shoulder 9 of the torque receiving section 2.

The internal surface of the nut is provided with two sets of threads, namely a substantially cylindrical thread 11 within the torque receiving section 2 and within the major part of the flange 1, and a frustoconical thread 12 within the clamping section 3. The plane where the threads 11 and 12 meet is indicated at 10. That portion (11a) of the internal surface of the flange 1 which is immediately adjacent the underside 4 is unthreaded and is in part cylindrical and in part frustoconical; this portion 11a can be used for centering the nut on an object which is to be engaged by the underside 4 of the flange 1 when the nut is properly applied and while its threads 11, 12 mate with the external thread of a bolt, a screw or any other externally threaded fastener.

As can be best seen in FIG. 1c, the cylindrical internal thread 11 can extend into that part of the clamping section 3 which is of one piece with the torque receiving section 2, i.e., the plane 10 is or can be located within the clamping section 3. The conical internal thread 12 of the clamping section 3 tapers in a direction toward the axis of the nut and again away from the underside 4 of the flange 1. The purpose of the clamping section 3 is to reliably engage the external thread of a male fastener and to thus prevent or reduce the likelihood of loosening the nut, e.g., when the nut is used to secure the hub of a wheel to the axle of a motor vehicle.

The internal surface of the nut can be provided with a circumferentially complete groove 10a in or close to the plane 10. The depth of the groove 10a (which can be said to constitute an undercut) exceeds (or can exceed) the depth of grooves of adjacent internal threads 11 and 12. An advantage of the groove 10a is that it entails or permits the removal of a chip or shaving in the region of the plane 10. Furthermore, the groove 10a can be dimensioned and its position can be selected in such a way that it reduces the moment of resistance of the respective part of the improved nut to a predetermined extent. This, in turn, enables the clamping section 3 to flex radially inwardly between the slots 8 to a desired extent to thus enhance and optimize the resiliency of the section 3.

In accordance with a feature of the invention which is illustrated in FIGS. 1a, 1b and 1c, the clamping section 3 is obtained by first forming the recesses 8 (e.g., by resorting to a material removing operation), by thereupon flexing the four parts of the section 3 radially inwardly to form a conical internal surface, and by thereupon forming (e.g., by material removal) the conical internal thread 12 into the conical internal surface of the thus obtained clamping section 3. In other words, the imparting of conicity to the surface which exhibits the thread 12 is carried out prior to the making of such conical internal thread. Stated in a still different way, the thread 12 is formed into a frustoconical internal surface of the otherwise finished clamping section 3.

An important advantage of the improved nut is that the conical internal thread 12 as well as the recesses 8 are made by material removal. It has been found that a clamping section 3 of such flexibility ensures the elimination or great reduction of losses of clamping torque upon the application of a tensioning or tightening force regardless of whether the improved nut is put to use for the first time or after a number of applications and loosenings. Furthermore, the clamping torque is not adversely influenced by various bolt flank diameters within the flank diameter tolerances. Different clamping torques can be arrived at with the same thread diameter by the simple expedient of modifying the clamping section 3.

It was also discovered that the nut can be further simplified and improved by the expedient of making the thread 12 and the recesses 8 of the clamping section 3 as well as the cylindrical thread 11 of the torque receiving section 2 by material removal. At least one of the threads 11 and 12 can be found in accordance with a material removing technique, including thread cutting. Such thread forming techniques ensure that the geometry of the threads remains unchanged and that the convolutions of the threads are not subjected to any textural or material overstressing. This is due to the fact that, at least in connection with the making of the clamping section 3 in accordance with the present invention, the thread 12 is not deformed and does not undergo any plastic changes of a nature which would entail damage to the external thread of a male fastener during application or loosening of the nut. Moreover, the aforedescribed mode of making the clamping section 3 can be combined with such selection of the shape of internal thread 12 that the convolutions of this thread do not exhibit any sharp ridges and/or edges in the regions where the convolutions are interrupted by grooves. This, in turn, ensures that the mating male and female threads do not develop or cause the development of chips and/or shavings when the nut is rotated relative to an externally threaded fastener and/or vice versa. In other words, the extent of friction during application and/or loosening of the nut is minimal or nil which reduces the danger of seizing, scuffing and/or scoring of the thread 11 and/or 12 and/or of the external thread of a male fastener as well as the danger or possibility of losses of clamping torque. Still further, the improved nut ensures the distribution of friction among a large number of convolutions forming part of the thread 11 and/or 12 and/or the male thread as well as on large portions of flanks of such convolutions, especially those of the conical thread 12; all of this eliminates or at least greatly reduces the likelihood of pronounced localized friction.

The threads of the improved nut can be made in a numerically controlled machine in such a way that the thread forming operation or operations take place simultaneously with the shaping of the sides of the flange 1 (provided that the flange is of one piece with the torque receiving section 2 or is affixed to the section 2 prior to making of the threads 11 and/or 12). Thus, a single mounting of a blank (which is to be converted into the improved nut) in a numerically controlled machine can suffice to ensure that the underside 4 of the flange 1 is exactly normal to the common longitudinal axis of the sections 2, 3, i.e., to the common longitudinal axis of the threads 11, 12.

The internal groove 10a constitutes an optional but desirable and advantageous feature of the improved nut. As already mentioned above, the groove 10a reduces the likelihood of the formation of chips and/or shavings during the making of the thread 11 and/or 12. Moreover, the groove 10a can be dimensioned and configurated in such a way that it enhances, in an accurately controlled manner, the resiliency of the nut in the region where the parts of the clamping section 3 merge into the torque receiving section 2.

The flange 1 can constitute a solidly reshaped section of the improved nut irrespective of whether it is made of one piece with the section 2 or is produced separately to be thereupon rigidly or rotatably secured to the section 2.

Figure 2B:
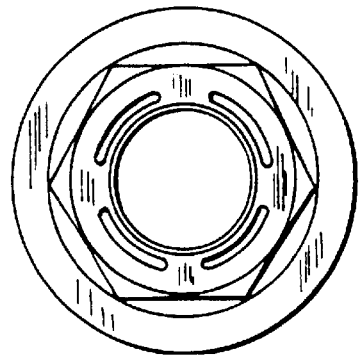

FIGS. 2a and 2b illustrate a castellated flange nut which is similar to the nut of FIGS. 1a to 1c except that the flange or base 1a is a separately produced part which is thereupon united with or rotatably coupled to the sections 2a and 3a. Furthermore, the internal surface 1aa of the flange 1a is not threaded, i.e., the cylindrical internal thread begins in the adjacent end portion of the torque receiving section 2a. The internal surface 1aa can be utilized to permit accurate centering of the nut of FIGS. 2a and 2b on a complementary projection of an object which is to be engaged by the underside 4a of the flange 1a.

The flange 1a can be made of a material which is the same as or which is different from the material of the sections 2a and 3a. The sections 2a and 3a are of one piece. For example, the material of the flange 1a can exhibit a more pronounced resiliency than the material of the sections 2a and 3a.

The flange 1a can be permanently secured to the section 2a or it can be rotatably connected thereto, e.g., by providing one of the sections 1a, 2a with a circular female detent for a circular male detent of the other section.

The construction and configuration of the sections 2a and 3a is or can be the same as described in connection with the construction and configuration of sections 2, 3 forming part of the nut which is shown in FIGS. 1a to 1c.

Figure 3A:
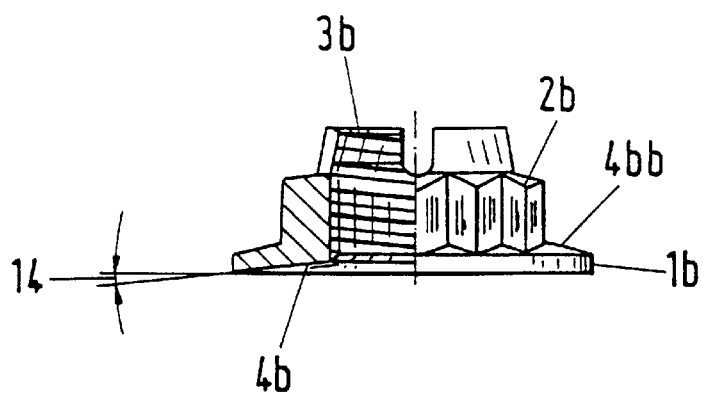
FIG. 3a is a sectional view of a third castellated flange nut along the common longitudinal axis.

The flange 1a has a side 4aa opposite the underside 4a, and the torque receiving section 2a has a face 2a' which is adjacent the side 4aa and makes therewith a relatively small acute angle 13. The preferred relationship of the angle 13 and an angle 14 which is shown in FIG. 3a will be described hereinafter. For certain applications, the angle 13 can be increased beyond that which is shown in FIGS. 2a and 2b.

Figure 3B:
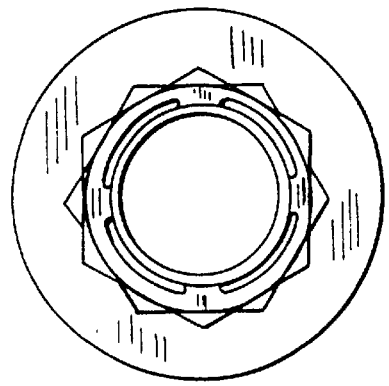
Figure 4A:
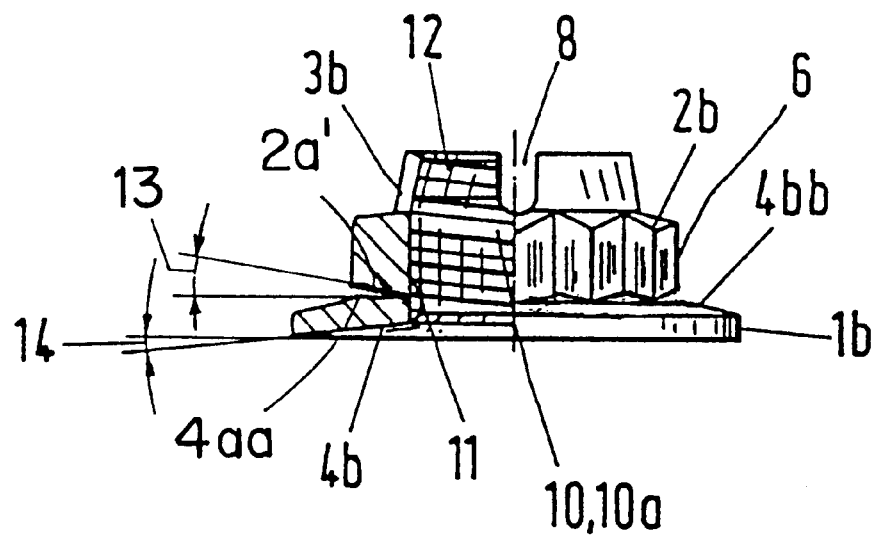
Figure 4B:
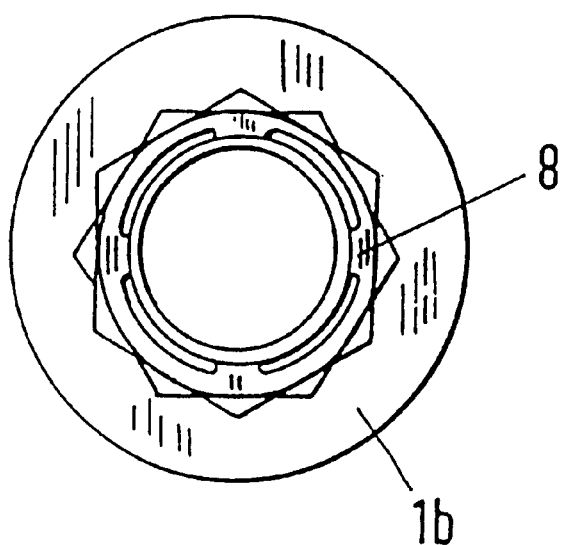

FIGS. 3a and 3b illustrate a third castellated flange nut which differs from the nut of FIGS. 1a to 1c primarily in that its flange 1b has a conical underside 4b. The flange 1b is of one piece with the torque receiving section 2b which, in turn, is of one piece with the clamping section 3b.

An advantage of the conical underside 4b is that the flange 1b is more likely to come into a pronounced (large) surface-to-surface contact with an object which is adjacent thereto when the nut is rotated relative to an externally threaded fastener (such as a screw or a bolt) to drive the nut home. Thus, the marginal portion of the flange 1b is first to engage a substantially plane surface and the flange 1b thereupon undergoes deformation as the nut continues to advance downwardly on an externally threaded fastener (as viewed in FIG. 3a) in order to be reliably applied for retention of one or more objects in desired position or positions. The flange 1a is and remains stressed when the application of the nut of FIGS. 3a and 3b is completed and its resilient deformation further reduces the likelihood of accidental loosening, even in response to repeated vibrations or other stray movements. Moreover, the deformed flange 1b reduces the likelihood of loosening of the nut in the event of fluctuation of the clamping force which is applied by the section 3b when the nut of FIGS. 3a and 3b is in use. The configuration of the flange 1b is preferably such that it exhibits a substantially constant tension across its entire cross section.

The flange 1b can be a separately produced part which is non-rotatably or rotatably affixed to the torque receiving section 2b in a manner as described with reference to the sections 1a and 2a of the nut shown in FIGS. 2a and 2b.

The cross-sectional area, the diameter, the concavity and/or the axial length of the flange 1b as well as the material of this flange can be selected in such a way that, when the nut of FIGS. 3a and 3b is applied (either for the first time or for the second, third, etc. time), the flange 1b undergoes an elastic but not plastic deformation. The resulting force of the elastically deformed flange 1b renders it possible, at least in connection with certain applications of the nut of FIGS. 3a and 3b, to achieve an initial or final force between the elastically deformed flange 1b and an adjacent object (e.g., a wheel hub) which at least partially compensates for at least some departure from an optimum shape and/or inclination of that surface of an object which is being engaged or is already finally or fully engaged by the concave underside 4b of the flange 1b. This ensures a more uniform distribution of pressures between the underside 4b and the adjacent surface of an object when the application of the nut of FIGS. 3a and 3b is completed. Another advantage of the just described elastically deformable flange 1b is that the initial stressing of the flange during application of the nut against an object can remain unchanged or nearly unchanged during an extensive angular movement of the nut and an externally threaded fastener relative to each other. In other words complete disengagement of the underside 4b of the flange 1b from the adjacent surface of an object can be postponed or delayed while the nut is in the process of carrying out an extensive axial displacement relative to an externally threaded fastener and/or vice versa.

If the features of the nuts of FIGS. 2a–2b and 3a–3b are combined, i.e., if the nut of FIGS. 2a–2b embodies a separately produced flange 1a which is fixedly or rotatably secured to the adjacent section 2a, the conical underside of the flange 1a and a plane which is normal to the common longitudinal axis of the sections 2a, 3a make an angle 14 which is preferably smaller than or at most equals the angle 13. The angle 13 diverges in a direction away from the common longitudinal axis of the sections 2a and 3a. The just outlined relationship between the angles 13, 14 has been found to be desirable and advantageous for a number of reasons, for example, because it ensures the establishment of more satisfactory circumstances during initial stressing of the flange 1a (having a concave underside).

The features of the nuts of FIGS. 1a–1c and/or 2a–2b and/or 3a–3b can be combined in a number of additional ways without departing from the spirit of the invention. Furthermore, such combinations can involve the utilization of one or more sections whose configuration and/or the method of making departs from those described in connection with FIGS. 1a to 3b. Still further, the sequence and/or the number of various heretofore described steps of making the improved nut and/or its sections can be altered in a number of ways; all such modifications are intended to be embraced by the scope of the appended claims.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method for fabricating a wheel nut having a longitudinal axis for separably fastening a wheel to a vehicle, the method comprising the steps of:

(a) forming a substantially sleeve-like clamping section spaced apart from a flange using a solid reshaping operation including at least one of hot and cold-extrusion, hot and cold forming, hot and cold heading and molding, wherein the flange includes a side, and the sleeve-like clamping section includes an external surface and an internal surface;

(b) forming a torque receiving section using a solid reshaping operation, with the torque receiving section being coaxial with the sleeve-like clamping section and disposed between the flange and the sleeve-like clamping section, wherein the side of the flange faces away from the torque receiving section and the sleeve-like clamping section and being engageable with an object in response to rotation of the wheel nut around an externally threaded fastener;

(c) forming a plurality of annular recesses in the sleeve-like clamping section using a material removal operation, wherein the plurality of recesses extend substantially parallel to the common longitudinal axis, the plurality of recesses being narrower than the portions of the clamping section adjacent to the recesses; and (d) flexing the sleeve-like clamping section towards the longitudinal axis, such that the internal surface forms a conical frustum;

(e) forming a substantially cylindrical internal thread in the torque receiving section and an at least partially conical internal thread by another material removal operation in a final operation;

(f) cutting, in a final step, a conical internal thread in the conically shaped sleeve-like clamping section; and (g) the conical shaped sleeve-like clamping section being unthreaded prior to the final step.

* * * * *